United States Patent
Tanaka

(10) Patent No.: US 9,462,139 B2
(45) Date of Patent: Oct. 4, 2016

(54) IMAGE PROCESSING SYSTEM AND IMAGE PROCESSING METHOD

(71) Applicant: KYOCERA Document Solutions Inc., Osaka-shi, Osaka (JP)

(72) Inventor: Toshihiko Tanaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/927,340

(22) Filed: Oct. 29, 2015

(65) Prior Publication Data

US 2016/0127572 A1 May 5, 2016

(30) Foreign Application Priority Data

Oct. 31, 2014 (JP) ................................. 2014-222689

(51) Int. Cl.
*H04N 1/00* (2006.01)
*H04N 1/32* (2006.01)

(52) U.S. Cl.
CPC ...... *H04N 1/00061* (2013.01); *H04N 1/00087* (2013.01); *H04N 1/00204* (2013.01); *H04N 1/00506* (2013.01); *H04N 1/32101* (2013.01); *H04N 2201/0094* (2013.01)

(58) Field of Classification Search
None
See application file for complete search history.

(56) References Cited

U.S. PATENT DOCUMENTS

| 2003/0231338 A1* | 12/2003 | Haga ...................... H04L 12/58 358/1.15 |
| 2011/0199623 A1 | 8/2011 | Okuyama |
| 2012/0154835 A1* | 6/2012 | Tonegawa ................ H04N 1/60 358/1.9 |
| 2014/0368716 A1* | 12/2014 | Maruyama ............. G03B 17/18 348/333.01 |
| 2015/0190709 A1* | 7/2015 | Moorthy ................. A63F 9/183 463/9 |

FOREIGN PATENT DOCUMENTS

JP 2011166781 A 8/2011

* cited by examiner

*Primary Examiner* — Fan Zhang
(74) *Attorney, Agent, or Firm* — Alleman Hall McCoy Russell & Tuttle LLP

(57) ABSTRACT

An image processing system includes a vote adding portion, a vote reception portion, a vote determination portion, and a default registration portion. The vote adding portion adds a vote key indicating whether image data is good or bad, to the image data. The vote reception portion displays, of the vote key, a goodness key indicating that the image data is good, in a selectable manner, and receives selection of the goodness key. The vote determination portion counts the number of votes to the goodness key and determines whether or not the counted number of votes to the goodness key is equal to or greater than a predetermined threshold value. When the number of votes is equal to or greater than the threshold value, the default registration portion automatically registers a setting condition for the image reading of the transmitted image data as an initial setting condition.

4 Claims, 5 Drawing Sheets

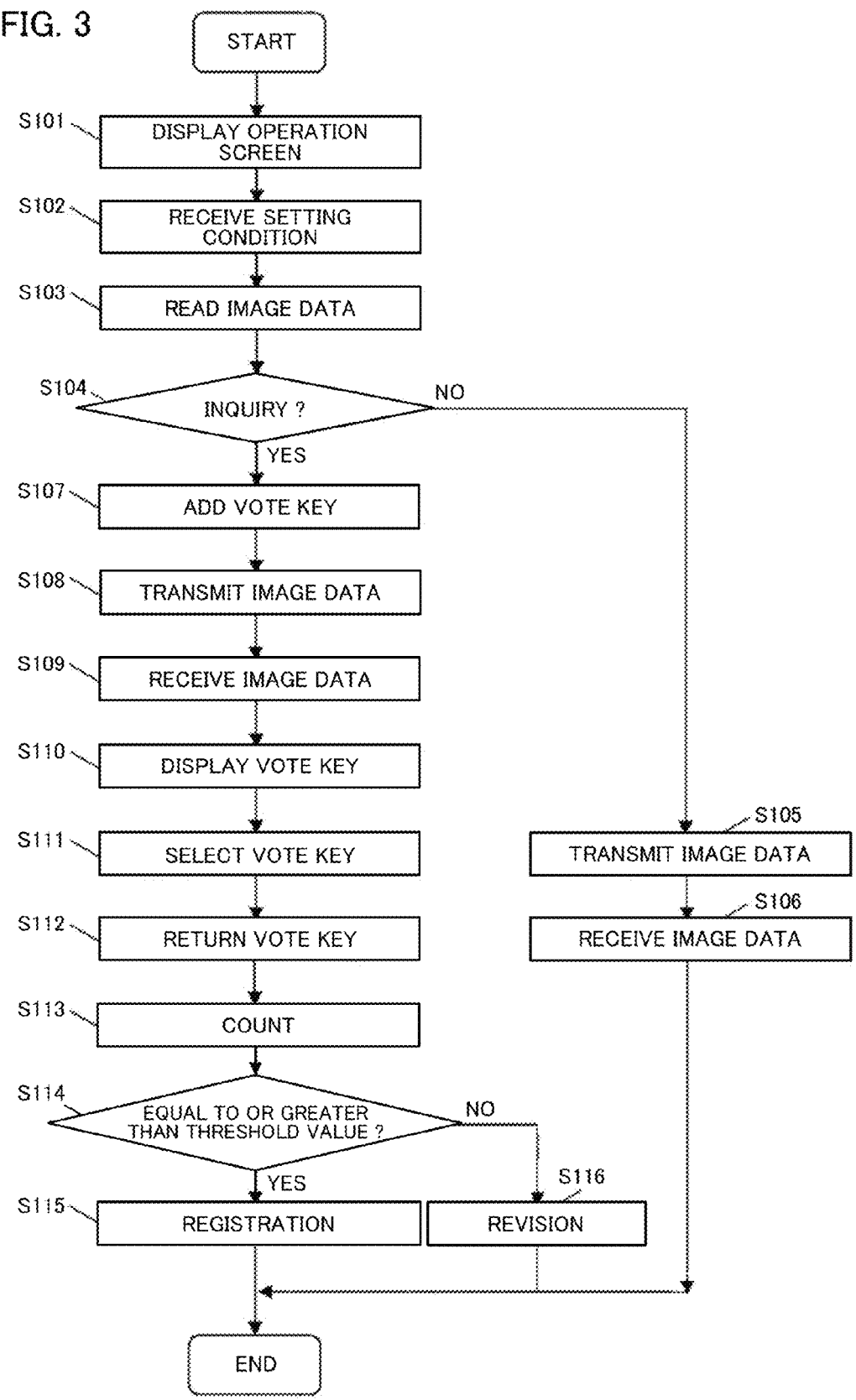

IMAGE PROCESSING SYSTEM AND IMAGE PROCESSING METHOD

INCORPORATION BY REFERENCE

This application is based upon and claims the benefit of priority from the corresponding Japanese Patent Application No. 2014-222689 filed on Oct. 31, 2014, the entire contents of which are incorporated herein by reference.

BACKGROUND

The present disclosure relates to an image processing system and an image processing method.

There are various techniques of a setting method for image data read in an image processing apparatus such as a scanner, a copy machine, or a multifunction peripheral. For example, as related art, there is known an image processing apparatus that includes a storage portion which stores default setting, and a display portion which displays a setting content in which the default setting is reflected. This apparatus includes a display control portion which causes the display portion to display a setting content changed in accordance with an instruction from a user, and a setting history storing portion which, in the case of executing image processing in accordance with the displayed setting content, stores the setting content for the processing to be executed, as setting history information. Further, the apparatus includes a determination portion which determines whether or not to change the default setting based on plural pieces of the stored setting history information, and an update portion which, when it is determined that the default setting is to be changed, updates the default setting to default setting determined based on the plural pieces of setting history information. Thus, it becomes possible to provide initial setting in accordance with a usage purpose or preference of a user.

SUMMARY

An image processing system according to one aspect of the present disclosure is an image processing system including an image processing apparatus and a terminal device. The image processing system includes a vote adding portion, a vote reception portion, a vote determination portion, and a default registration portion. In the image processing apparatus, when image data read in a predetermined setting condition is to be transmitted to the terminal device, the vote adding portion adds a vote key indicating whether the image data is good or bad, to the image data. In the terminal device, when the image data with the vote key added thereto is to be displayed, the vote reception portion displays, of the vote key, a goodness key indicating that the image data is good, in a selectable manner, and receives selection of the goodness key. In the image processing apparatus, when the goodness key is selected, within a predetermined period, the vote determination portion counts the number of votes to the goodness key and determines whether or not the counted number of votes to the goodness key is equal to or greater than a predetermined threshold value. In the image processing apparatus, when the number of votes is equal to or greater than the threshold value, the default registration portion automatically registers the setting condition for the image reading of the transmitted image data as an initial setting condition.

An image processing method according to another aspect of the present disclosure is an image processing method for an image processing system including an image processing apparatus and a terminal device. The image processing method includes a vote adding step, a vote reception step, a vote determination step, and a default registration step. In the vote adding step, when image data read in a predetermined setting condition is to be transmitted to the terminal device, the image processing apparatus adds a vote key indicating whether the image data is good or bad, to the image data. In the vote reception step, when the image data with the vote key added thereto is to be displayed, the terminal device displays, of the vote key, a goodness key indicating that the image data is good, in a selectable manner, and receives selection of the goodness key. In the vote determination step, when the goodness key is selected, within a predetermined period, the image processing apparatus counts the number of votes to the goodness key and determines whether or not the counted number of votes to the goodness key is equal to or greater than a predetermined threshold value. In the default registration step, when the number of votes is equal to or greater than the threshold value, the image processing apparatus automatically registers the setting condition for the image reading of the transmitted image data, as an initial setting condition.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a flowchart showing an execution procedure in the embodiment of the present disclosure.

DETAILED DESCRIPTION

Hereinafter, with reference to the accompanying drawings, embodiments of an image processing system and an image processing method of the present disclosure will be described for understanding of the present disclosure. The embodiments described below are examples in which the present disclosure is embodied, and are not intended to limit the technical scope of the present disclosure. An alphabet S written before numerical characters in a flowchart denotes step.

Hereinafter, an image processing system including a terminal device and an image processing apparatus will be described as an example of the embodiments of the present disclosure. The image processing apparatus of the present disclosure is, for example, a multifunction peripheral (MFP) having functions of a facsimile, a copy machine, a scanner, a printer, and the like.

Figure 1:
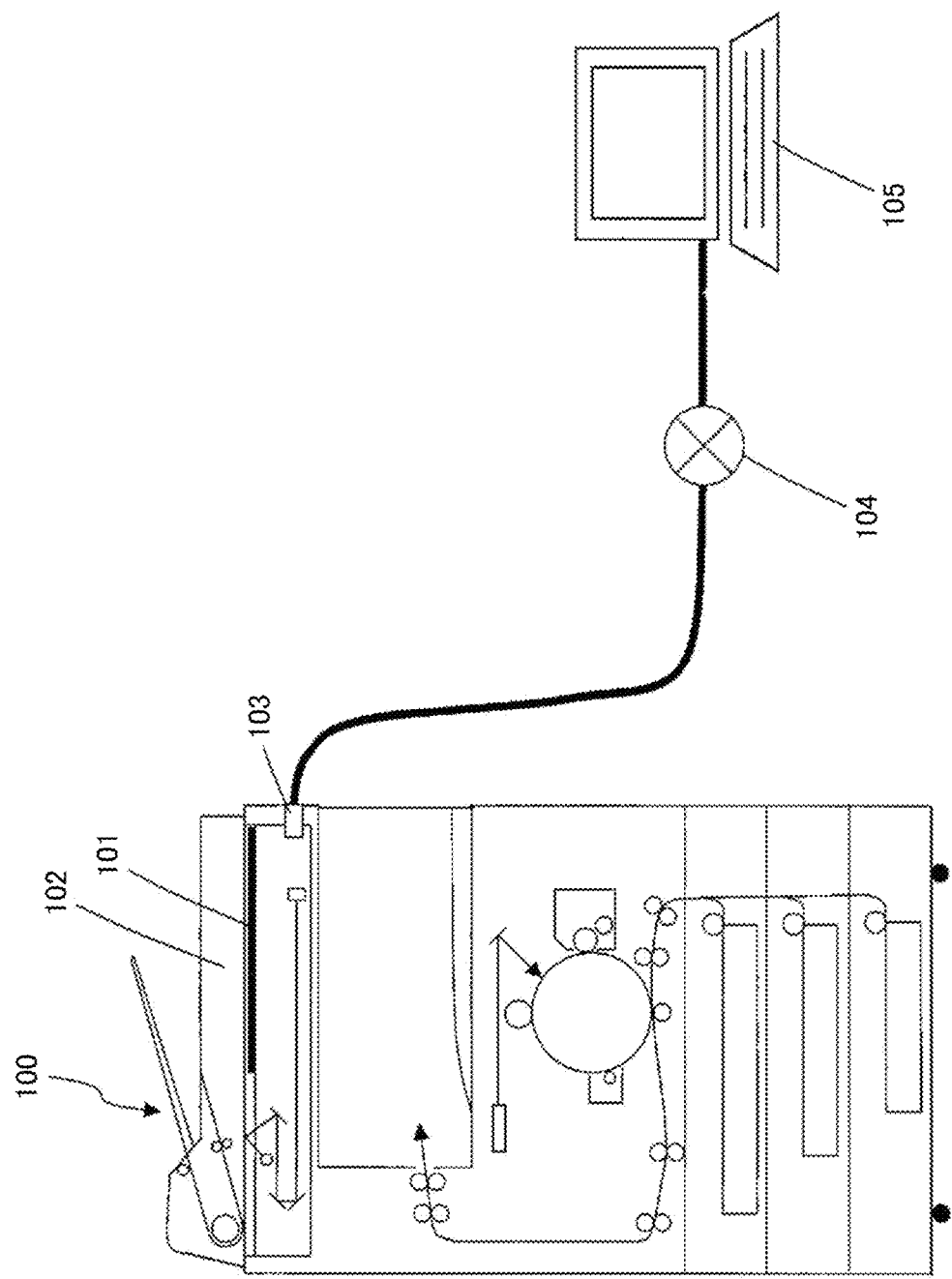
FIG. 1 is a conceptual diagram showing the entire configuration of an image processing system according to the present disclosure.

As shown in FIG. 1, when having received an image reading job and an image transmission job for a document from a user via an operation portion 101 including a touch panel, a multifunction peripheral 100 drives each portion such as an image reading control portion 102, an image transmission control portion 103, and the like, to provide the image reading job and the image transmission job. The image reading control portion 102 of the multifunction peripheral 100 drives an image reading portion based on an instruction from the operation portion 101 or an initial setting condition set in advance, to read image data of a document or the like placed on a reading table (document table). The image transmission control portion 103 of the multifunction peripheral 100 drives an image transmission portion based on an instruction from the operation portion 101, to transmit the read image data to a terminal device 105 which is a predetermined transmission destination. Here, the multifunction peripheral 100 is communicably connected with the terminal device 105 via a network 104. Therefore, the multifunction peripheral 100 and the terminal device 105 constitute the image processing system.

As control circuits of the multifunction peripheral 100 and the terminal device 105, although not shown, a central processing unit (CPU), a read only memory (ROM), a random access memory (RAM), a hard disk drive (HDD), and a driver corresponding to each drive portion are connected via an internal bus. The CPU of each of the multifunction peripheral 100 and the terminal device 105, for example, uses the RAM as a working area, executes a program stored in the ROM, the HDD, or the like, gives and receives data, an instruction, a signal, an order, and the like from the driver based on a result of the execution, and controls operation of each drive portion relevant to execution of various processes. Each portion (shown in FIG. 2) described later other than the drive portions is also realized by the CPU executing the corresponding program. The ROM, the RAM, the HDD, and the like store programs and data for realizing each section described below.

In the aforementioned related art, since the default setting is updated to predetermined default setting based on plural pieces of setting history information about setting operated by a user, there is a problem that a user's operation is needed. In the case of transmitting image data read in a predetermined initial setting condition to a predetermined transmission destination, normally, it is more preferable that a user who has received the image data, rather than a user who has caused the image data to be read, evaluates the image data. That is, if an opinion of a user at a transmission destination, instead of an operation history of a user at a transmission source, is reflected in an initial setting condition relevant to reading of image data, conveniences of the users at the transmission source and the transmission destination are improved. In this respect, the multifunction peripheral 100 can improve conveniences of the users at the transmission source and the transmission destination in reading and transmission of image data.

Figure 2:
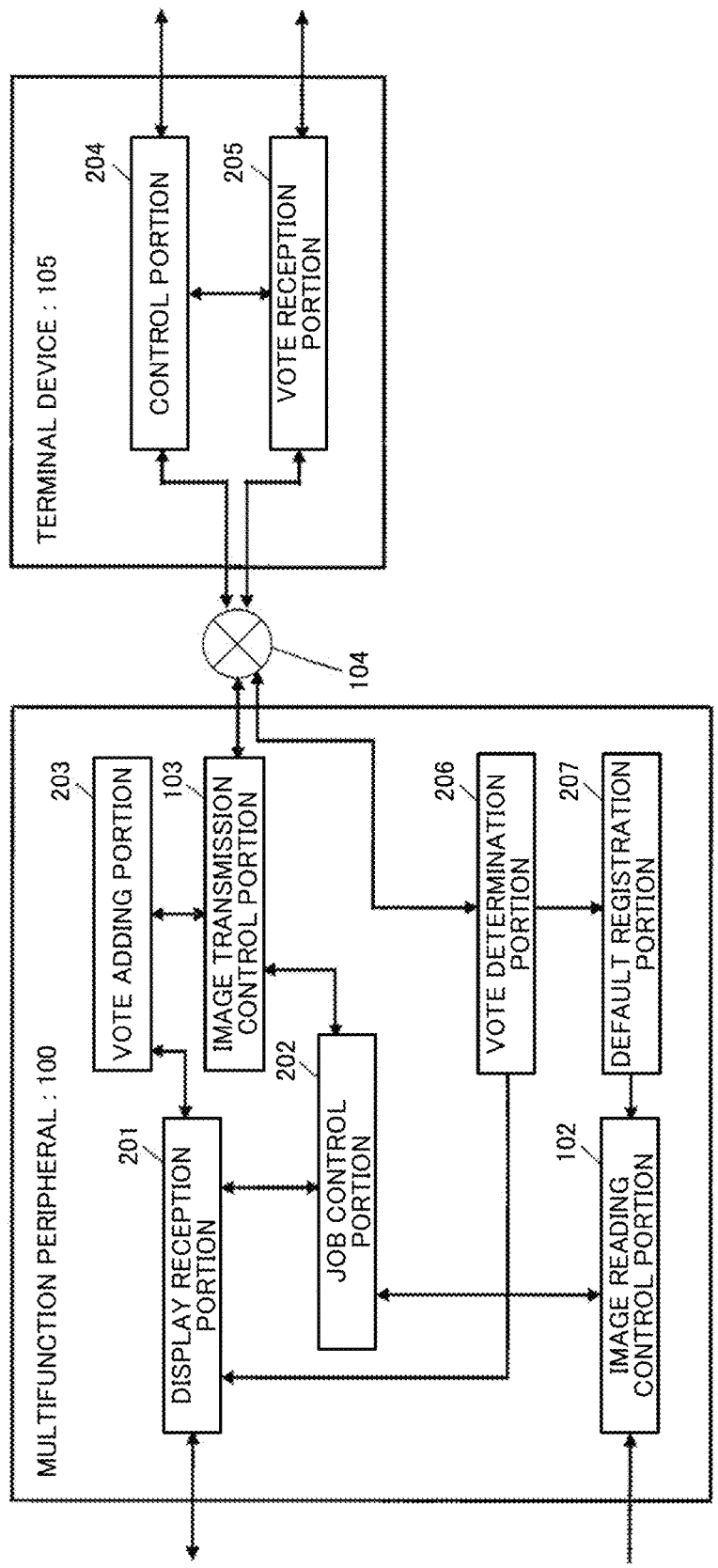
FIG. 2 is a function block diagram of the image processing system according to an embodiment of the present disclosure.

Next, with reference to FIG. 2 and FIG. 3, a configuration and an execution procedure according to an embodiment of the present disclosure will be described. First, when a user A starts the multifunction peripheral 100, a display reception portion 201 of the multifunction peripheral 100 displays a predetermined operation screen on the touch panel of the operation portion 101 (FIG. 3: S101).

Here, while viewing the operation screen, the user A inputs setting conditions of an image reading job for reading image data of a predetermined document, and an image transmission job for transmitting predetermined image data to a predetermined transmission destination. For the setting condition of the image reading job, the user A inputs "monochrome image data" as an image mode, "300 dpi" as a resolution, and "256" as a density, for example. For the setting condition of the image transmission job, the user A inputs a mail address of a user B as a transmission destination, and image data obtained by the image reading job as a transmission target, for example.

Then, the user A places a document on the reading table, and selects a start key while viewing the setting conditions of the image reading job and the image transmission job. Then, the display reception portion 201 receives the inputted setting conditions of the image reading job and the image transmission job (FIG. 3: S102), and notifies a job control portion 202 of the reception. The job control portion 202 having been notified allocates a job to each portion in accordance with the types of jobs that have been received.

First, the job control portion 202 notifies the image reading control portion 102 of the image reading job. The image reading control portion 102 having been notified drives the image reading portion to read image data of the document on the reading table in accordance with the setting condition (image mode, resolution, density) of the image reading job (FIG. 3: S103). Thus, image data that the user A desires can be obtained.

When having completed the reading, the image reading control portion 102 notifies the job control portion 202 of the completion, and the job control portion 202 having been notified notifies the image transmission control portion 103 of the image transmission job. The image transmission control portion 103 having been notified drives the image transmission portion to transmit the image data to the transmission destination in accordance with the setting condition (transmission destination) of the image transmission job.

Here, when the image transmission control portion 103 is to transmit the image data, the image transmission control portion 103 notifies a vote adding portion 203 of the transmission. The vote adding portion 203 having been notified inquires of the user A about whether or not to add, to the image data to be transmitted, a vote key which indicates whether the image data is good or bad (FIG. 3: S104).

Here, a method for the vote adding portion 203 to inquire is not particularly limited. For example, before transmission of the image data, the vote adding portion 203 displays a vote key in a selectable manner on the touch panel of the operation portion 101, to receive selection of the vote key by the user A. When the vote key is selected, addition of the vote key is received from the user A.

While the user A viewing the vote key, if the user A selects a predetermined transmission key instead of selecting the vote key, the vote adding portion 203 does not add the vote key to the image data (FIG. 3: S104, NO), and notifies the image transmission control portion 103 of the selection of the predetermined transmission key. The image transmission control portion 103 having been notified transmits the image data to the terminal device 105 which is the transmission destination (FIG. 3: S105). When having received the image data (FIG. 3: S106), a control portion 204 of the terminal device 105 displays the image data on a desktop. In this case, the user B of the terminal device 105 confirms the image data but does not vote as to whether the image data is good or bad.

Figure 4A:
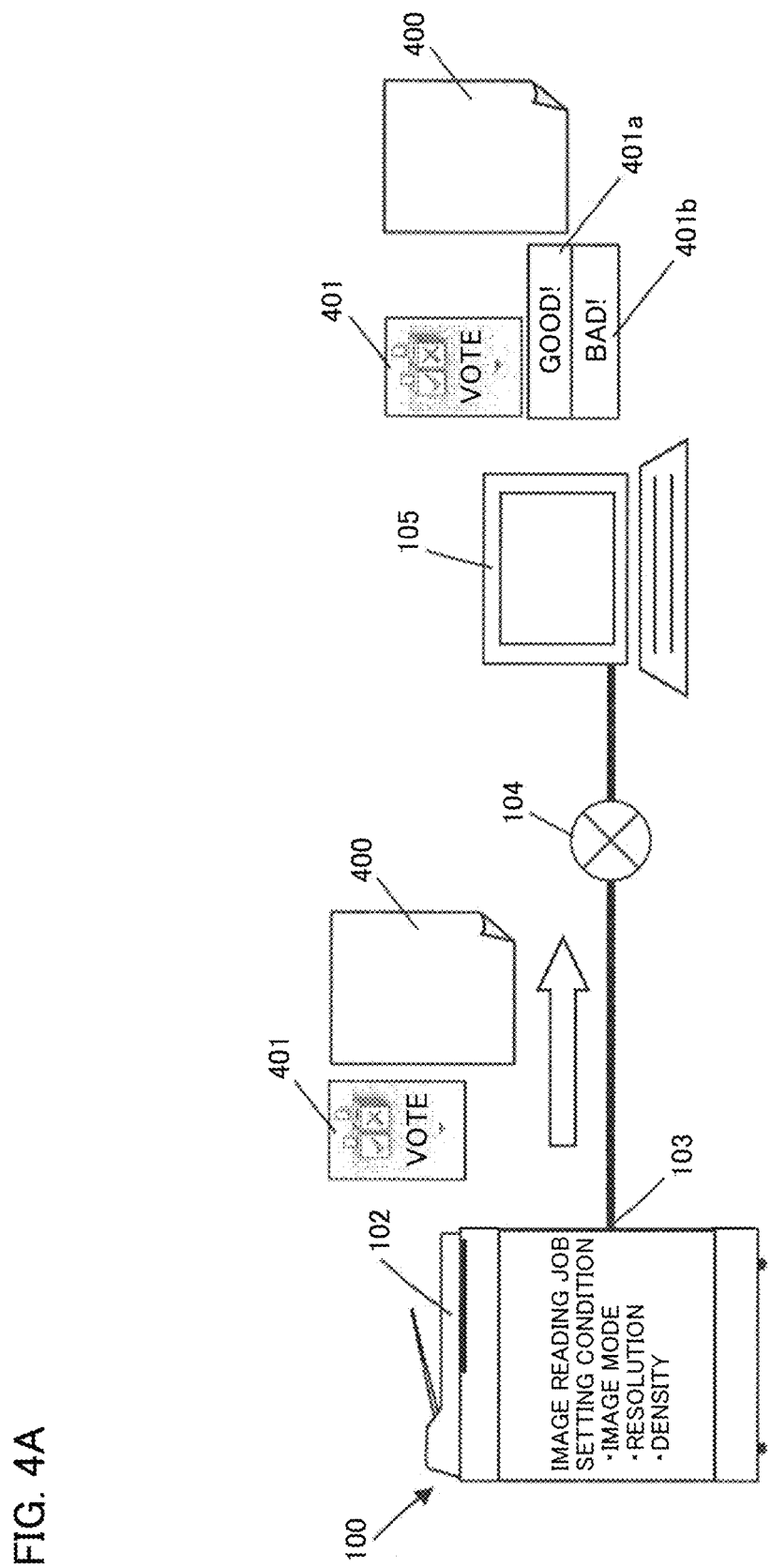
FIG. 4A is a diagram showing an example of transaction of image data with a vote key added thereto, in the image processing system according to the embodiment of the present disclosure.

On the other hand, in S104, while the user A viewing the vote key, if the user A selects the vote key and selects the transmission key, as shown in FIG. 4A, the vote adding portion 203 adds a vote key 401 to image data 400 (FIG. 3: S107). A method for the vote adding portion 203 to add the vote key 401 is not particularly limited. For example, in the case of transmitting the image data 400 by mail, the vote key 401 is added to a massage part in the mail so that the user B at the transmission destination can select the vote key 401. When having completed the addition of the vote key 401, the vote adding portion 203 notifies the image transmission control portion 103 of the completion, and as shown in FIG. 4A, the image transmission control portion 103 having been notified transmits the image data 400 with the vote key 401 added thereto, to the terminal device 105 which is the transmission destination, via the network 104 (FIG. 3: S108). When having received the image data 400 with the vote key 401 added thereto (FIG. 3: S109), the control portion 204 of the terminal device 105 displays the image data 400 on the desktop.

Here, when the control portion 204 is to display the image data 400, if the vote key 401 exists in the image data 400, the control portion 204 notifies a vote reception portion 205 of the existence. The vote reception portion 205, as well as displaying the image data 400, displays, in a selectable manner, a goodness key 401a (for example, "Good!" key) indicating that the image data 400 is good, and a badness key 401b (for example, "Bad!" key) indicating that the image data 400 is bad, corresponding to the vote key 401 (FIG. 3: S110).

Figure 4B:
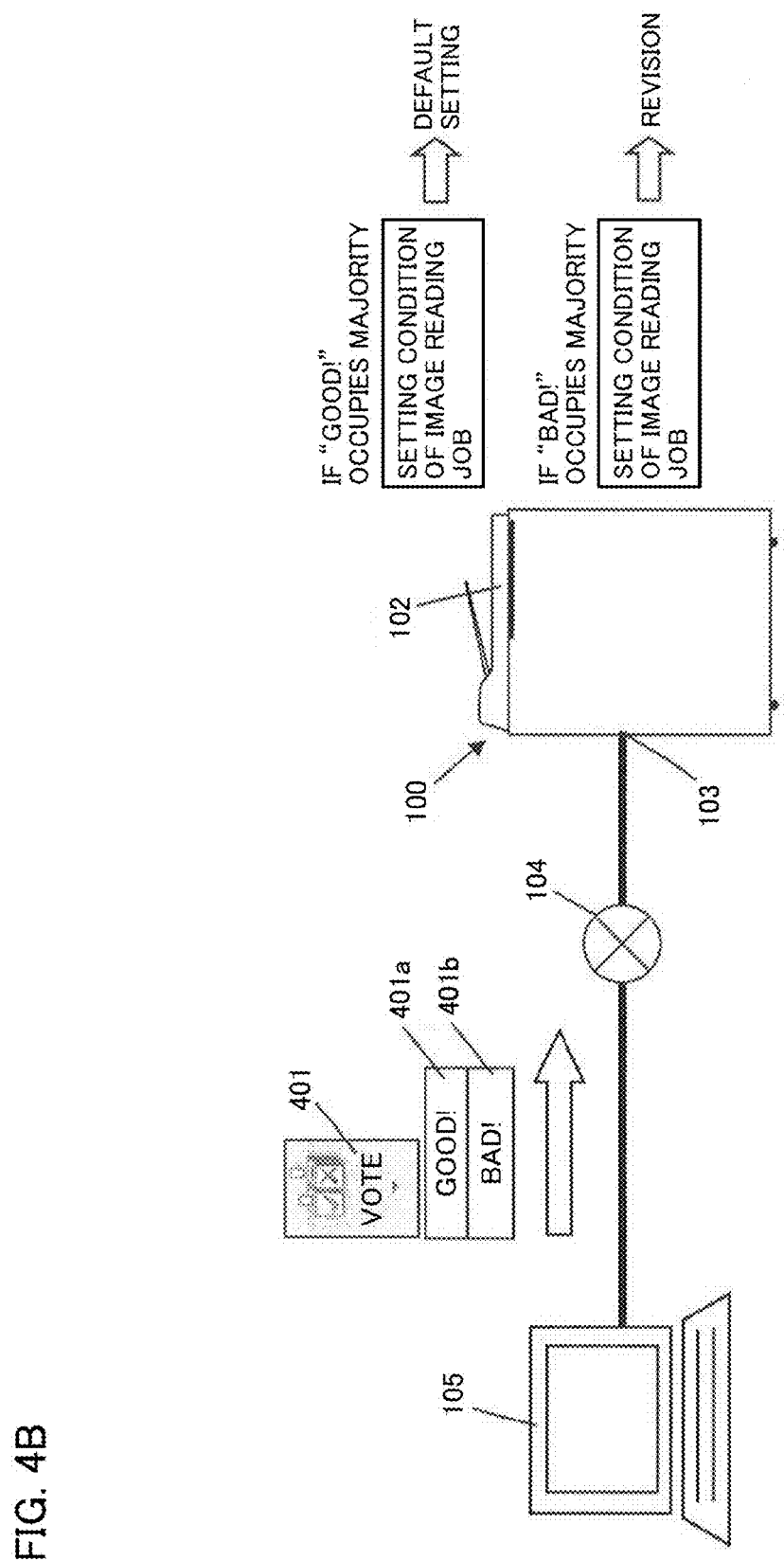
FIG. 4B is a diagram showing an example of counting and processing of the number of votes to a vote key, in the image processing system according to the embodiment of the present disclosure.

While viewing the content of the image data 400, if the content (quality) of the image data 400 is good, the user B selects the goodness key 401a. If the content of the image data 400 is bad, the user B selects the badness key 401b. Examples of the content of the image data 400 include a visual quality of the image data 400. As described above, when the user B selects the vote key 401, i.e., the goodness key 401a or the badness key 401b, the vote reception portion 205 receives the selection of the vote key 401 (FIG. 3: S111), and as shown in FIG. 4B, returns the goodness key 401a or the badness key 401b of the vote key 401 from the terminal device 105 to the multifunction peripheral 100 via the network 104 (FIG. 3: S112). When having received the selection of the vote key 401 from the terminal device 105, a vote determination portion 206 of the multifunction peripheral 100 counts the number of votes to the goodness key 401a of the vote key 401 within a predetermined period (for example, one month from the transmission of the image data 400) (FIG. 3: S113).

After the period has elapsed, the vote determination portion 206 determines whether or not the counted number of votes to the goodness key 401a is equal to or greater than a predetermined threshold value (FIG. 3: S114). Here, the threshold value is not particularly limited. For example, in the case where a plurality of transmission destinations are selected in the image transmission job, the threshold value is set to half the number of the transmission destinations. Thus, if the number of votes becomes equal to or greater than the threshold value, it is considered that half the users or more have determined that the content of the image data 400 is good.

In S114, if the number of votes to the goodness key 401a is equal to or greater than half the number of entire votes and thus is equal to or greater than the threshold value (FIG. 3: S114, YES), the vote determination portion 206 notifies a default registration portion 207 of this fact. The default registration portion 207 having been notified automatically registers the setting condition for the image reading (image reading job) of the transmitted image data, as the initial setting condition (FIG. 3: S115). Here, of the setting condition of the image reading job, "monochrome image data" of the image mode, "300 dpi" of the resolution, and "256" of the density are registered as the initial setting condition. The default registration portion 207 registers the initial setting condition for each image mode ("monochrome image data", "color image data"). Thus, the initial setting condition can be registered in a detailed manner so as to reflect therein an opinion of the user B at the transmission destination. In addition, since the initial setting condition is automatically registered, the user A at the transmission source need not particularly perform any operation, and thus convenience of the user A at the transmission source is improved.

Instead of registering the initial setting condition by the user A who has read the image data, the initial setting condition is registered so as to reflect therein an opinion of the user B at the transmission destination. Therefore, the user at the transmission destination can hereafter confirm good image data. In other words, at the next time, when the user at the transmission source reads image data in the initial setting condition and transmits the image data to another user, the user at the transmission source can transmit image data that is likely to be accepted (highly evaluated) by another user.

On the other hand, in S114, if the number of votes to the badness key 401b is equal to or greater than half the number of entire votes and thus the number of votes to the goodness key 401a is smaller than the threshold value (FIG. 3: S114, NO), the vote determination portion 206 notifies the display reception portion 201 of this fact, and the display reception portion 201 having been notified displays, on the touch panel, a revision screen to promote revision of the setting condition for the image reading of the transmitted image data 400 (FIG. 3: S115). Then, when the user A at the transmission source views the revision screen, the user A changes the setting condition of the image reading job for the future. Thus, through trial and error by the change, the quality of image data to be transmitted can be improved. The display reception portion 201 may cause the operation portion 101 to display the revision screen, or if a mail address of the user A at the transmission source is known, may transmit the revision screen to the user A at the transmission source by mail.

In the above embodiment of the present disclosure, the vote key 401 is added to the image data 400 in response to one execution of the image reading job and the image transmission job. However, another configuration is possible. For example, in the case where a plurality of users A repeatedly use a setting condition of a predetermined image reading job to transmit image data obtained by the image reading job to a plurality of transmission destinations, the vote key 401 may be added to the image data 400 per execution of the image reading job and the image transmission job so as to allow users B at the plurality of transmission destinations to evaluate the setting condition of the same image reading job.

The vote determination portion 206 may determine, for each predetermined setting condition set as the image transmission condition, whether or not the number of votes (or a ratio of votes) by the goodness key 401a becomes equal to or greater than a predetermined threshold value within a predetermined period, and the default registration portion 207 may register, as the initial setting condition, a setting condition for which the number of votes is equal to or greater than the threshold value (or the ratio of votes is equal to or greater than the predetermined threshold value) and for which the number of votes is the greatest (or the ratio of votes is the greatest).

Although the multifunction peripheral 100 and the terminal device 105 of the image processing system are configured to have each portion, a program for realizing each portion may be stored in a non-transitory computer-readable storage medium, and the non-transitory computer-readable storage medium may be provided. In this configuration, the program is read by the image processing apparatus and the terminal device, whereby the image processing apparatus and the terminal device realize each portion. In this case, the program itself read from the non-transitory computer-readable storage medium provides the operation and effect of the present disclosure. Alternatively, the steps to be executed by respective means may be stored in a hard disk and thus may be provided as a method.

Thus, the image processing system and the image processing method according to the present disclosure are useful for an image processing system including an image processing apparatus such as a multifunction peripheral or a copy machine, and are effective as an image processing system and an image processing method that allow for improvement in conveniences of users at a transmission source and a transmission destination in reading and transmission of image data.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing system comprising an image processing apparatus and a terminal device, wherein
the image processing apparatus includes a vote adding portion configured to, when image data read in a predetermined setting condition is to be transmitted to the terminal device, add a vote key indicating whether the image data is good or bad, to the image data,
the terminal device includes a vote reception portion configured to, when the image data with the vote key added thereto is to be displayed, display, of the vote key, a goodness key indicating that the image data is good, in a selectable manner, and receive selection of the goodness key,
the image processing apparatus includes a vote determination portion configured to, when the goodness key is selected, within a predetermined period, count the number of votes to the goodness key and determine whether or not the counted number of votes to the goodness key is equal to or greater than a predetermined threshold value, and
the image processing apparatus includes a default registration portion configured to, when the number of votes is equal to or greater than the threshold value, automatically register the setting condition for the image reading of the transmitted image data, as an initial setting condition.

2. The image processing system according to claim 1, wherein the image processing apparatus further includes a display reception portion configured to, when the number of votes is smaller than the threshold value, display a revision screen to promote revision of the setting condition for the image reading of the transmitted image data.

3. The image processing system according to claim 1, wherein when the image data is to be transmitted, the vote adding portion inquires of a user about whether or not to add the vote key to the image data, and when addition of the vote key is received from the user, the vote adding portion adds the vote key to the image data.

4. An image processing method for an image processing system including an image processing apparatus and a terminal device, the image processing method comprising:
a vote adding step of, when image data read in a predetermined setting condition is to be transmitted to the terminal device, the image processing apparatus adding a vote key indicating whether the image data is good or bad, to the image data,
a vote reception step of, when the image data with the vote key added thereto is to be displayed, the terminal device displaying, of the vote key, a goodness key indicating that the image data is good, in a selectable manner, and receiving selection of the goodness key,
a vote determination step of, when the goodness key is selected, within a predetermined period, the image processing apparatus counting the number of votes to the goodness key and determining whether or not the counted number of votes to the goodness key is equal to or greater than a predetermined threshold value, and
a default registration step of, when the number of votes is equal to or greater than the threshold value, the image processing apparatus automatically registering the setting condition for the image reading of the transmitted image data, as an initial setting condition.

* * * * *